US012757871B1

(12) United States Patent
Millbern et al.

(10) Patent No.: US 12,757,871 B1
(45) Date of Patent: Oct. 13, 2026

(54) ODOR IMPRINTATION TRAINING MUZZLE FOR SERVICE DOGS

(71) Applicants: Ryan Millbern, Lakewood Ranch, FL (US); Reagan Millbern, Lakewood Ranch, FL (US)

(72) Inventors: Ryan Millbern, Lakewood Ranch, FL (US); Reagan Millbern, Lakewood Ranch, FL (US)

( * ) Notice: Subject to any disclaimer, the term of this patent is extended or adjusted under 35 U.S.C. 154(b) by 0 days.

(21) Appl. No.: 18/648,821

(22) Filed: Apr. 29, 2024

(51) Int. Cl.
*A01K 25/00* (2006.01)
*A01K 15/02* (2006.01)

(52) U.S. Cl.
CPC .......... *A01K 15/0207* (2025.08); *A01K 25/00* (2013.01)

(58) Field of Classification Search
CPC ................................ A01K 25/00; A01K 5/008
USPC .......................................................... 119/712
See application file for complete search history.

(56) References Cited

U.S. PATENT DOCUMENTS 3,126,869 A * 3/1964 Young .................... A01K 15/02 119/832
9,049,845 B2 6/2015 Albuquerque
10,791,710 B1 * 10/2020 White .................... A01K 15/02
10,813,342 B2 * 10/2020 Maughan ............... A01K 15/02
2011/0146588 A1 * 6/2011 Ward ..................... A01K 15/02 119/720
2011/0203349 A1 * 8/2011 Reese .................... A01K 25/00 73/23.34
2014/0060452 A1 3/2014 Fraunhofer-Gesselschaft et al.
2019/0389719 A1 * 12/2019 Gerhardt ................ A01K 25/00
2022/0361453 A1 * 11/2022 Kishon .................. A01K 25/00

FOREIGN PATENT DOCUMENTS

AT 515786 A4 * 12/2015 ............. A01K 25/00

OTHER PUBLICATIONS

AT-515786-A4_MACHINE_TRANSLATION (Year: 2015).*

* cited by examiner

*Primary Examiner* — Peter M Poon
*Assistant Examiner* — Sahar Almatrahi

(57) ABSTRACT

The present invention relates to a dog training device for reducing detection dog training time. The device comprises a muzzle with an odor sample attachment. This allows imprinting dogs on target odors faster than traditional pipes or boxes, utilizing operant conditioning. The muzzle delivers odor samples directly to the dog's nose, creating a strong positive association. This invention decreases training times from months to weeks. More imprinted dogs can enter service faster, increasing public safety. The device benefits trainers through increased throughput. Dogs are more receptive to the muzzle over pipes. The public benefits from more available detection dogs.

9 Claims, 4 Drawing Sheets

ODOR IMPRINTATION TRAINING MUZZLE FOR SERVICE DOGS

BACKGROUND OF THE INVENTION

1. Field of the Invention

The present invention relates to a dog training device for reducing detection dog training time and, more particularly, to an odor imprintation training muzzle for sniffing dogs having interchangeable cartridges. Each cartridge contains a sample of a predetermined scent.

2. Description of the Related Art

Several designs for biological systems, e.g. with detection by animals or plants, have been designed in the past. None of them, however, include an odor imprintation training muzzle for service dogs that includes an odor sample attachment for training of detection dogs.

Applicant believes that a related reference corresponds to U.S. Pat. No. 9,049,845 issued for a System Apparatus And Method Of Training Dogs To Detect Complex Hazardous Substances. The "845" reference relates to detection of Improvised Explosive Devices, regarding defense of cities, military installations, forces and assets and civilian personnel against attacks, involving Home-Made Explosives. More particularly, the present invention enables training of scent detecting working dogs to detect individual components of home-made explosives such as ammonium nitrate (AN), potassium chlorate $KClO3$ (also known as PC) and similar chemicals in close proximity to an array of fuels such as sugar, powdered aluminum or petroleum jelly without requiring the components to be mixed into an unstable, explosive, compound, as the combined components would be normally encountered in an operational environment. The reference U.S. Pat. No. 9,049,845 does not teach of hew speeds nor mixed odors attached to dogs muzzles, and is not intended for imprinting.

Applicant believes that another related reference corresponds to U.S. patent publication No. 2014/0060452 published for a Controllable Scent Sample Dispenser, And Animal Training And Testing System For Detecting Scents. The instant reference to a (remote) controllable scent sample dispenser, the use of the remote controllable scent sample dispenser for supplying a scent sample with a predefined dosing rate to an animal's nose, a method for determining the minimum scent concentration of a scent sample an animal or an scent detection means can detect, and a method of positive-reinforced scent training an animal for reliable recognition of scent sample. In particular, the present invention relates to an animal training or testing system (ATS) for detecting a scent sample with a high reliability even if the scent samples have a very low scent concentration. Thus, the present invention generally relates to the field of training an animal, such as a dog, regarding scent detection and training.

None of these references, however, teach of a dog training device for reducing detection dog training time. The device comprises a muzzle with an odor sample attachment.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an odor imprintation training muzzle for service dogs that decreases the training times for the dogs.

It is another object of this invention to provide an odor imprintation training muzzle for service dogs that permits an easy and fast training method for service dogs.

It is still another object of the present invention to provide an odor imprintation training muzzle for service dogs that includes a container with interchangeable samples to train the dogs to identify different items.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
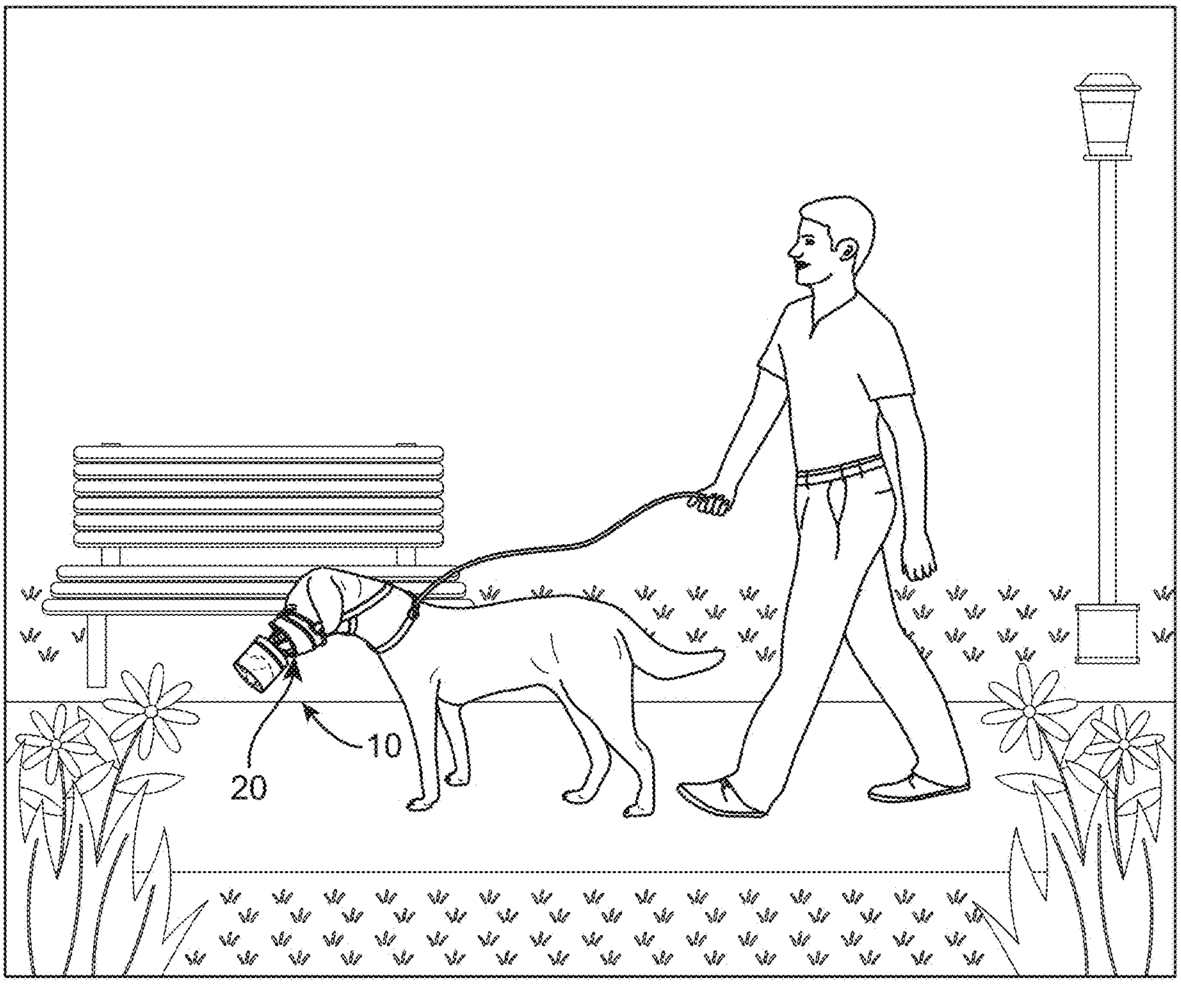
FIG. 1 represents an isometric operational view of the present invention 10 showing the muzzle assembly 20 mounted to a dog.

Referring now to the drawings, where the present invention is generally referred to with numeral 10, it can be observed that it basically includes muzzle assembly 20 and sampling assembly 40. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The muzzle assembly 20 includes a muzzle 22. The muzzle 22 may be a dog muzzle. In one of the preferred embodiments, the muzzle 22 may be a solid muzzle with a front opening to ensure air to flow therethrough. In embodiments, the muzzle 22 may be a basket muzzle with a basket-like shell in the front portion of the muzzle 22. The shell of the muzzle 22 may receive a snout of a dog. The muzzle 22 may have multiple rods 26 to define the structure of the shell of the muzzle 22. The muzzle 22 may further include an attaching element 24 to secure the muzzle 22 to a dog. The muzzle 22 may be made of High Density Polyethylene (HDPE), a non catalyst metal such as stainless steel, or any other suitable material for a pet muzzle. It should be understood that muzzle 22 may be any muzzle suitable for dogs.

The sampling assembly 40 includes a container 42 and a sample 46. In one of the preferred embodiments, the container 42 may have a substantially cylindrical shape. It should be understood that other embodiments may include spherical containers, rectangular containers, prismatic containers, or any other suitable container. Preferably, the container 42 may be made of HDPE. In other embodiments the container 42 may be made of other suitable materials such as wood, non catalyst metal, or the like. The container 42 may be a transparent container. The container 42 may have a circular opening with a threaded outer portion to receive a threaded portion.

The sample 46 may be an odor sample. The sample 46 may be a piece of cloth like material, bed bugs, knotweed, bumblebee's, a cork, a sponge, or any other material that can be impregnated with an odor. The sample 46 may be impregnated with specific odors related to drugs, explosives, medical conditions, weapons, tracking, contraband, or the like. The sample 46 may be impregnated with potassium chlorate, ammonium nitrate, TNT, Nitroglycerin, or any other smell or scent related to simple or complex explosive components that a dog can detect by smelling. The sample 46 may be impregnated with odors to detect drugs such as marijuana, heroin, cocaine, crystal meth, fentanyl, mdma, opioids, opiates, K2, bath salts, xanax, or any other kind of drugs. The sample 46 may also be impregnated with complex chemical odors to detect medical conditions such as lung cancer, bladder cancer, breast cancer, prostate cancer, skin cancer, ovarian cancer, migraines, blood variations for diabetes patients, Parkinson's disease, COVID-19, or any other medical condition detectable by dogs. The sample 46 can also be impregnated with odors related to low-explosive powders, cleaning solvents, or any other odors related with firearms. The sample 46 may be impregnated with any smell a dog can be able to detect. It should be understood that different samples 46 may be impregnated with different smells to train a dog for the detection of different odors related to drugs, explosives, weapons and medical conditions.

Figure 3:
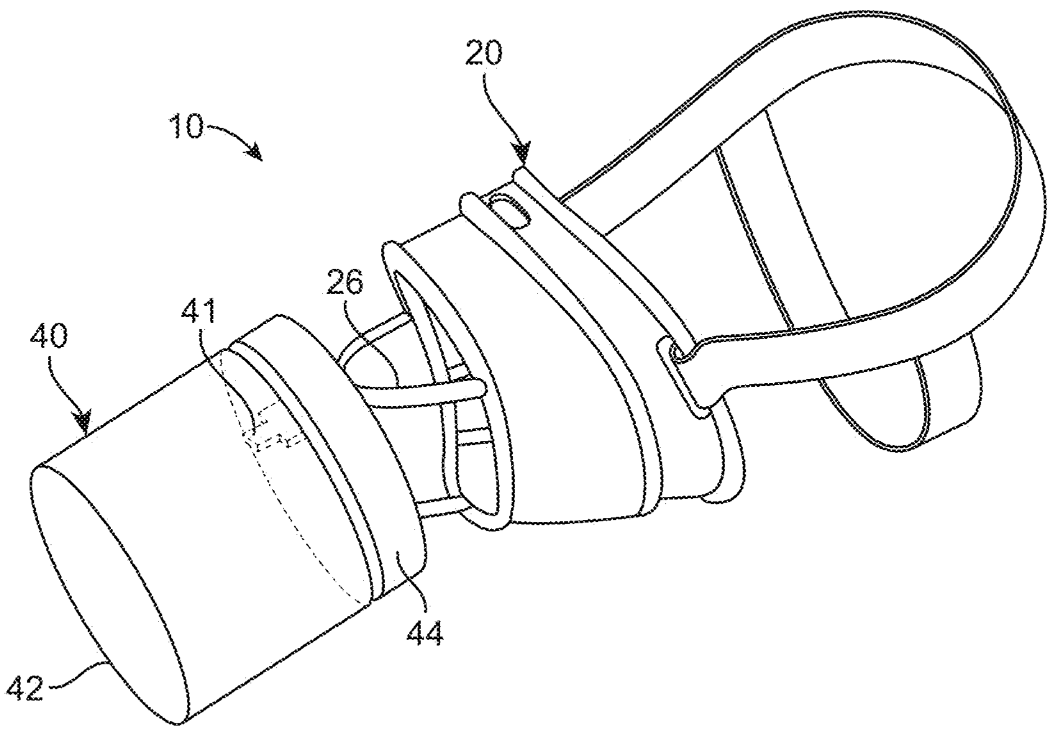
FIG. 3 illustrates an isometric view of the present invention 10 with the sampling assembly 40 attached to the muzzle assembly 20 using fasteners 41.
Figure 4:
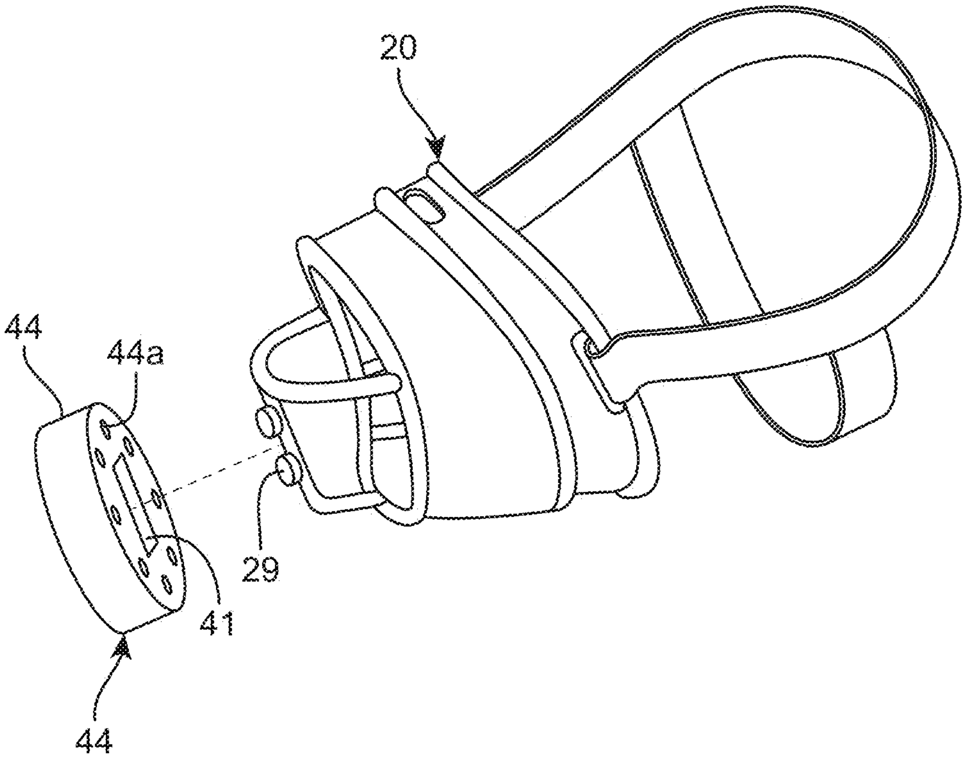
FIG. 4 is a representation of a rear view of the present invention 10 showing the lid 44 attached to the muzzle assembly 20 with the fasteners 41 securing the lid 44 through holes 44*a*.

The sampling assembly 40 may further include a lid 44. Preferably, the lid 44 may have a substantially circular shape with an interior side wall having a threaded portion to cooperate with the threaded portion of the container 42 to removably close and secure the container 42. The lid 44 may have a flat portion with a plurality of holes 44*a* distributed thereon. The holes 44*a* may cross an entire width of the lid 44. The holes 44*a* may allow odors from inside the container 42 to flow out of the container 42 through the holes 44*a* of the lid 44. The holes 44*a* may further allow to secure the lid 44 removably attached to the container to rods 26 of a front portion of the shell of the muzzle 22 as illustrated in FIG. 3. The holes 44*a* may be circular holes. The holes 44*a* may have any other suitable shape. The lid 44 may be secured to the rods 26 with fasteners 41. In one of the preferred embodiments the fasteners 41 may be magnetic fasteners. In other embodiments, the fasteners 41 may be cable tie fasteners, straps, or any other suitable fastener that can attach the lid 44 to the rods 26. The rods 26 may have fasteners 29. The fasteners 29 may be magnetic fasteners that cooperate with the magnetic fasteners 41 to secure the sampling assembly 40 to the muzzle assembly 20. Multiple containers 42 may be prepared with different samples 46 to easily interchange the container 42 with the sample 46 in the lid 44.

Figure 2:
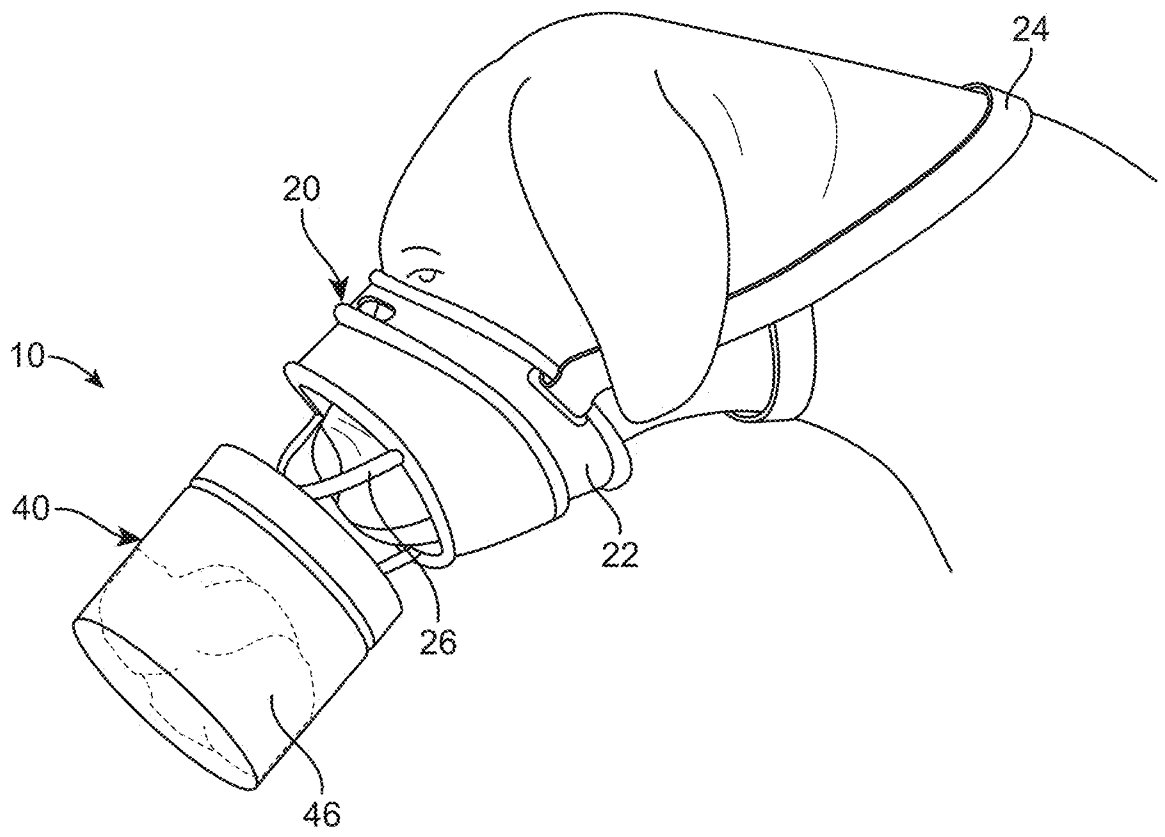
FIG. 2 shows a lateral view of the present invention 10 showing the sampling assembly 40 attached to the muzzle assembly 20 with the muzzle assembly 20 mounted to a dog.

Referring now to FIG. 2, the muzzle assembly 20 may be secured to a dog using the attaching element 24 around the rear portion of the head of the dog. The muzzle 22 may be located on the snout of the dog. The muzzle 22 may be an open muzzle formed with multiple rods 26. The sampling assembly 40 may be secured to one of the rods 26 at a front portion of the muzzle 22. The sampling assembly 40 may have one sample 46 inside the container. The sample 46 may be impregnated with a specific odor for training a dog. The sample 46 may be used for odor imprinting exposing dogs to target odors to train the dogs to identify the odors in the environment. Preferably, the odor imprinting may be exposing the odors in a positive environment and/or in a fun environment for the dog such as a walk or playing with a ball so the dog may associate fun with the odors to reinforce learning and identification of odors. It also may be suitable to provide toys or treats to the dog to associate the target odors with a positive association with the target odors.

Once the dog has made a positive association with the target odor, the dog may be trained to provide a conditioned response in the presence of a target odor. A conditioned response may include dog's behaviors such as but not limited to sitting down, freezing in place, barking, or scratching. A dog may be trained showing different conditioned responses to identify different odors related to drugs, explosives, weapons, and medical conditions. A treat may be provided to the dog when the dog finds a target odor or provides a conditioned response accurately, the treat may reinforce the learned behavior to the dog.

A method to train a detection dogs may include a first step securing the muzzle assembly 20 to the dog with the muzzle 22 placed at the snout of the dog. A second step may include securing the sampling assembly 40 to the muzzle 22 with one of the samples 46 located inside the container 42. A third step may include walking the dog or playing with the dog when the dog has the muzzle 22 with the sample 46 of a target odor, thereby creating a positive association to the target odor so the dog can learn to identify the odor. A fourth step may be training the dog to provide a conditioned response to associate the odor with a particular behavior. The sample 46 associated with a positive environment may reduce the training times from months to weeks increasing the availability of service dogs for public safety.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An odor imprintation training muzzle for service dogs, comprising:

a) a muzzle assembly including a muzzle, wherein said muzzle is configured to be worn by a service dog, said muzzle has a cage structure defined by rods on a front portion thereof configured to cover a dog's snout, wherein said rods include a vertical rod with magnets disposed along a length thereof; and b) a sampling assembly interchangeably secured to the muzzle; said sampling assembly includes a container with a lid; wherein said lid comprises:

i. a circular body with holes disposed on a top surface thereof: said holes are arranged along a periphery of said top surface;

ii. a magnetic slot located at a center of the top surface, wherein said magnetic slot has a rectangular shape;

c) wherein an odor sample is housed inside the container, which in turn is closed by said lid; the closed container is attached to said muzzle assembly by inserting the magnets into said magnetic slot, said odor sample configured to be used for training the service dog.

2. The odor imprintation training muzzle for service dogs set forth in claim 1, wherein said container is made of a transparent plastic.

3. The odor imprintation training muzzle for service dogs set forth in claim 2, wherein the container has a cylindrical shape.

4. The odor imprintation training muzzle for service dogs set forth in claim 1, wherein said holes allow a fluid communication between an interior of the container and an exterior when the container is closed with the lid.

5. The odor imprintation training muzzle for service dogs set forth in claim 1, wherein said odor sample is impregnated with an odor related to drugs.

6. The odor imprintation training muzzle for service dogs set forth in claim 1, wherein said odor sample is impregnated with an odor related to weapons.

7. The odor imprintation training muzzle for service dogs set forth in claim 1, wherein said odor sample is impregnated with an odor related to explosives.

8. The odor imprintation training muzzle for service dogs set forth in claim 1, wherein said odor sample is impregnated with an odor related to medical conditions.

9. An odor imprintation training muzzle for service dogs, consisting of:

a) a muzzle assembly including a muzzle with a securing strap configured to go around a dog's neck, wherein said securing strap secures the muzzle in place when worn; said muzzle has a cage structure defined by a vertical rod and a horizontal rod on a front portion thereof configured to cover a dog's snout, wherein said rods are arranged in a T-shape formed by the vertical rod and the horizontal rod; wherein the vertical rod has two circular magnets disposed along a length thereof; and b) a sampling assembly including a container, a lid, and an odor sample, said sampling assembly is interchangeably secured to the muzzle, said container is a cylindrical container made of a transparent plastic, said odor sample is housed inside the container, said lid is a threaded lid used to close the container, said lid having a plurality of holes arranged in a circular pattern along a periphery of a top surface thereof, said plurality of holes allow a fluid communication between an interior of the container and an exterior allowing the dog to smell the odor sample, said odor sample configured to be used for training the service dog; wherein said lid further includes a central magnetic slot;

c) wherein the closed container with the odor sample inside is secured to the muzzle by inserting the two circular magnets into said magnetic slot.

* * * * *